(12) United States Patent
Chatterjee et al.

(10) Patent No.: US 7,930,372 B2
(45) Date of Patent: Apr. 19, 2011

(54) STAGED INTEGRATION OF DISTRIBUTED SYSTEM AND PUBLISHING OF REMOTE SERVICES

(75) Inventors: Anirban Chatterjee, Austin, TX (US); Ajay Kumar Mahajan, Austin, TX (US); Atit D. Patel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 12/060,281

(22) Filed: Apr. 1, 2008

(65) Prior Publication Data
US 2009/0248856 A1 Oct. 1, 2009

(51) Int. Cl.
*G06F 15/177* (2006.01)
(52) U.S. Cl. .................. 709/220; 709/223; 709/245
(58) Field of Classification Search ............ 203/203, 203/220, 229; 705/1; 709/220, 223, 245
See application file for complete search history.

(56) References Cited

U.S. PATENT DOCUMENTS

| | | | |
|---|---|---|---|
| 5,500,940 A | 3/1996 | Skeie | |
| 6,631,487 B1 | 10/2003 | Abramovici et al. | |
| 6,728,897 B1 | 4/2004 | Cramer et al. | |
| 7,043,419 B2 | 5/2006 | Chess et al. | |
| 7,139,925 B2 | 11/2006 | Dinker et al. | |
| 7,197,561 B1 | 3/2007 | Lovy et al. | |
| 7,206,836 B2 | 4/2007 | Dinker et al. | |
| 7,483,962 B2 * | 1/2009 | Lim et al. | 709/220 |
| 7,555,566 B2 * | 6/2009 | Blumrich et al. | 709/249 |
| 7,788,476 B2 * | 8/2010 | McNutt et al. | 713/1 |
| 2004/0030769 A1 * | 2/2004 | Lim et al. | 709/223 |
| 2007/0168695 A1 | 7/2007 | Chen et al. | |
| 2009/0157844 A1 * | 6/2009 | Fionda et al. | 709/218 |
| 2009/0259713 A1 * | 10/2009 | Blumrich et al. | 709/201 |

OTHER PUBLICATIONS

Staddon et al., "Efficient Tracing of Failed Nodes in Sensor Networks", Sep. 2002, pp. 122-130, ACM, Georgia.

* cited by examiner

*Primary Examiner* — Khanh Q Dinh
(74) *Attorney, Agent, or Firm* — Yee & Associates, P.C.; Libby Z. Toub

(57) ABSTRACT

A method, computer program product, and system for the staged integration of a remote entity and the simultaneous publishing of services is provided. The integration of the distributed remote entities is broken into five stages, with appropriate events published after each stage. Each of the five stages is initiated only if the previous stage completed successfully. The first stage is the initiate discovery phase. The first event is the discovery start event. The second stage is the discovery completed phase. The second event is the discovery completed event. The third stage is the basic software services verified phase. The third event is the basic software verification completed event. The fourth stage is the basic hardware services verified phase. The fourth event is the basic hardware verification completed event. The fifth stage is the extended hardware services verified phase. The fifth event is the full integration of disturbed entity event.

20 Claims, 5 Drawing Sheets

STAGED INTEGRATION OF DISTRIBUTED SYSTEM AND PUBLISHING OF REMOTE SERVICES

BACKGROUND OF THE INVENTION

1. Field of the Invention

The present invention relates generally to data processing systems. In particular, the present invention relates to a method, system, and computer program product for integrating nodes into a distributed network.

2. Description of the Related Art

In a distributed network where many nodes providing a variety of services can exist, a malfunctioning node may still be able to provide valuable services to this network. It would be useful to have the capability of integrating degraded nodes into the system, while simultaneously discovering, dynamically, the level of service the degraded nodes offer.

Currently, the solution employed in the industry to solve this problem is for a management node to verify hardware and firmware services before integrating the entity into the functioning system. If there is a malfunction detected, the entity is not integrated. This solution has several drawbacks. For example, the broken entities still have the capability to provide limited services. By not integrating the remote entity into the system, these limited services are not being taken utilized. Also, this approach also requires a tight coupling between the software-entity that locates the distributed entities and the entity that performs hardware and firmware service verification.

SUMMARY OF THE INVENTION

Exemplary embodiments provide for a method, computer program product and a system for a staged integration of a remote entity and simultaneously publishing services of the remote entity. Responsive to detecting an unknown node, a first event is published. Responsive to receiving the first published event, discovery of the unknown node is initiated. Responsive to successfully completing the discovery of the unknown node, a second event is published. Responsive to receiving the second event, verification of basic software services offered by the unknown node is initiated. Responsive to successfully completing the verification of basic software services offered by the unknown node, a third event is published. Responsive to receiving the third published event; verification of basic hardware services offered by the unknown node is initiated. Responsive to successfully completing the verification of basic hardware services offered by the unknown node, a fourth event is published. Responsive to receiving the fourth published event, verification of extended hardware services offered by the unknown node initiated. Responsive to successfully completing the verification of extended hardware services offered by the unknown node, a fifth event is published.

DETAILED DESCRIPTION OF THE INVENTION

Figure 1:
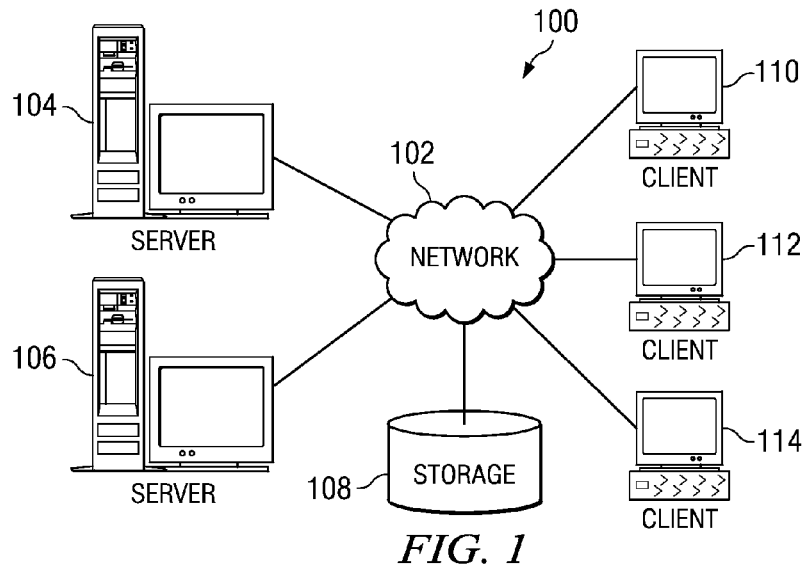
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
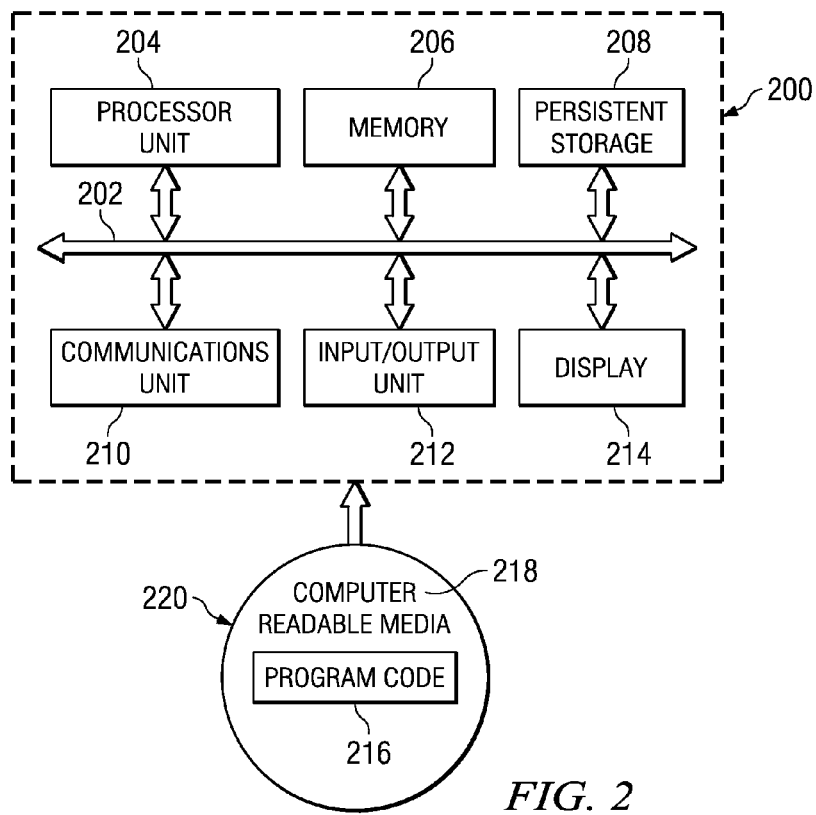
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
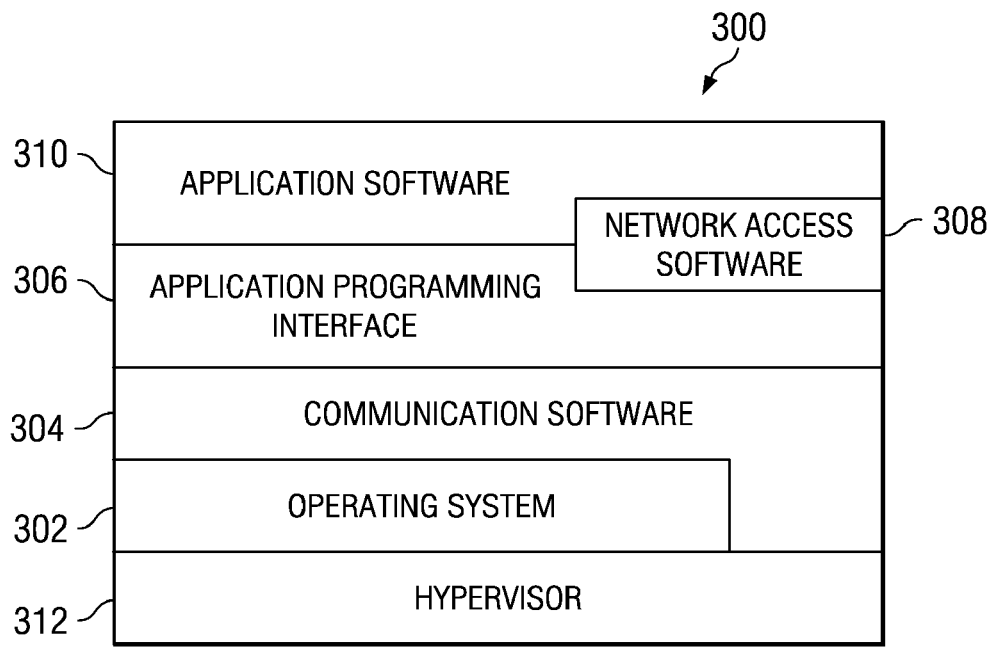
FIG. 3 is a block diagram showing typical software architecture for a server-client system in accordance with a preferred embodiment of the present invention.

Turning to FIG. 3, a block diagram showing typical software architecture, generally designated by reference number 300, for a server-client system is depicted in accordance with a preferred embodiment of the present invention. Operating system 302 is utilized to provide high-level functionality to the user and to other software. Operating system 302 may be implemented in server 104 or client 110 in FIG. 1, in which computer usable code or instructions implementing the processes for embodiments of the present invention may be located. Such an operating system typically includes BIOS. Communication software 304 provides communications through an external port to a network such as the Internet via a physical communications link by either directly invoking operating system functionality or indirectly bypassing the operating system to access the hardware for communications over the network.

Application programming interface (API) 306 allows the user of the system, an individual, or a software routine, to invoke system capabilities using a standard consistent interface without concern for how the particular functionality is implemented. Network access software 308 represents any software available for allowing the system to access a network. This access may be to a network, such as a LAN, WAN, or the Internet. With the Internet, this software may include programs, such as Web browsers.

Application software 310 represents any number of software applications designed to react to data through a communications port to provide the desired functionality the user seeks. Applications at this level may include those necessary to handle data, video, graphics, photos or text, which can be accessed by users of the Internet. Hypervisor 312 is a layer of software running on a platform that allows multiple instances of operating systems to be running simultaneously.

Virtualization support for an operating system is enabled through an additional software layer underneath operating systems running on a platform. Whereas usually operating systems are running directly on the hardware, in a virtualizeable system a layer called a 'hypervisor' or 'virtual machine monitor' is implementing a virtual machine where an operating system can be run inside. The hypervisor becomes the lowest software layer in the system.

A hypervisor manages and enforces the partitioning and/or sharing of all the processor cores in a logically partitioned system. For example, a hypervisor may dispatch a virtual partition to one or more physical processor cores. The logical partition includes a definition of the work to be done by each physical processor core as well as various settings and state information that are required to be set within each physical processor core in order for the physical processor core to execute the work.

In known shared processor systems, the hypervisor supervises and manages the sharing of each physical processor core among all of the logical partitions. Each logical partition will be defined by particular configuration data that is needed by a physical processor core to process that logical partition. The configuration data includes particular data, register values, states, settings, and information. All of the configuration data is stored by the hypervisor in the hypervisor's memory.

Exemplary embodiments provide for integrating a remote entity in stages, and simultaneously publishing services that were offered by this remote entity and verified in each stage. Exemplary embodiments enable the software components, which locate distributed entities to be decoupled easily from the components, which perform verification of the entities' hardware and firmware. Exemplary embodiments also allow a remote entity to function as part of the system even though the remote entity may only have been partially verified. After each integration stage is verified for the remote entity, the availability of the service of the remote entity will be published for use by the firmware and hypervisor components of the verifying node.

Node controllers are entities in a distributed network that provide hardware and firmware access to the hardware, such as processors, memory, and so forth, of the node that each node controller reside on. Two node controllers reside on each node, avoiding a single point failure. A data processing system may have a minimum of one and no maximum number of nodes. In an exemplary embodiment, the data processing system comprises eight nodes. Therefore, in a fully configured data processing system according to the exemplary embodiment, there would sixteen node controllers, eight nodes times two controllers for each node.

One node controller in each node is marked as the primary node controller, and the sibling node controller is marked as the backup node controller. Thus, if the system controller, also referred to as the service processor, loses communication to the primary node controller, the system controller would instruct the backup node controller to become the primary node controller in that node, in order to maintain hardware access capability for that node.

The software services offered by a node controller can consist of FFDC (first failure data capture) collection, node failover, hardware configuration, and facilitation of communication with hypervisor code running on the system processors. A node controller can be broken due to incorrect installation or hardware malfunction, either of which can limit the view of the hardware. However, such a node controller is still able to offer software services, such as FFDC collection, for example, and some amount of hardware access capability.

The standard approach to such errors is to avoid communication with the broken hardware and hold it in reset. However, such lack of communication prevents the use of any software service that is offered by these broken node controllers. For example, FFDC data collection becomes very difficult. Exemplary embodiments break down integration of a node controller into stages. Once a node controller enters into a certain stage, a list of services that are provided by that node controller is published in the system. Applications running on a service processor would only be able to access published services that are listed in that published event.

For example, once the node controller enters a "Discovery Completed" stage, the hardware verification component is able to choose to use the services offered by that node controller to verify hardware on the system. If hardware verification fails, the node controller would not progress into any subsequent stages. However, the node controller would still be providing the software services available in the current "Discovery Completed" stage. If hardware verification did complete successfully, then the node controller would be progressed into the next stage, and a list of services that are now provided by the node controller would be published on the service processor.

Similar stage transitions and publishing of events would occur until a node controller is fully integrated into the system. This approach allows easy and logical decoupling of components that maintain the current stage of all node controllers from the components that use the services provided by these node controllers.

Figure 4:
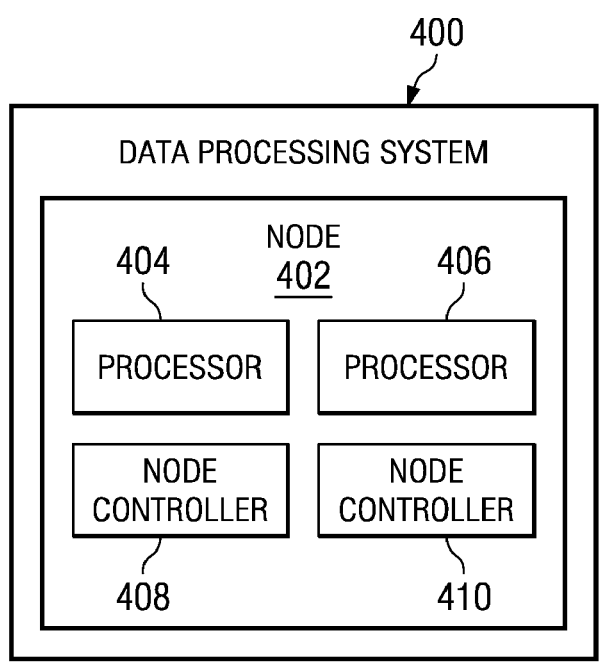
FIG. 4 is a block diagram of a data processing system with node controllers in which exemplary embodiments may be implemented.

Turning back to the figures, FIG. 4 is a block diagram of a data processing system with node controllers in which exemplary embodiments may be implemented. Data processing system 400, which may be implemented as data processing system 200 in FIG. 2, comprises node 402, processors 404 and 406, and node controllers 408 and 410.

Node 402 comprises of processors 404 and 406 and node controllers 408 and 410. Node controllers 408 and 410 provide hardware and firmware access to the hardware, such as processors 404 and 406, of node 402. A service processor, such as service processor 502 in FIG. 5, will assign one node controller of node controllers 408 and 410 to be primary node controller of node 402 and the other node controller will be assigned as the backup node controller of node 402.

Exemplary embodiments provide for breaking down the integration of the distributed remote entities into five stages, with appropriate events occurring at each stage.

The first stage is the initiate discovery phase. A software component detects the remote entity and publishes an event to the distributed network called the discovery start event. An event is similar to an interrupt. An event signals that a certain action has occurred/completed/arrived and so forth. An event can also be a message that is broadcast in the subsystem or on the network as a signal for an action. Publish means broadcast or sent. A published event is an event that has been broadcast or sent to the network or subsystem. Discovery is a software service that discovers distributed entities on a network. In an exemplary embodiment, node controllers broadcast user datagram protocol messages to the system controller. A software module on the system controller, known as a discovery module, reads this user datagram protocol message and then publishes an event that a node controller has been discovered. During the first stage, all services are blocked from the remote entity except for discovery services.

The second stage is the discovery completed phase. At this time an event called the discovery completed event is published to the distributed network. The event tells the components in the distributed network that, at this time, failure data capture components, hardware data information collection components, and basic software verification components of the remote entity become available for use by the distributed network. Failure data capture components are responsible for transferring error information logged on the node controllers to the system controller. For example, if a node controller was in an error state which prevents the node controller from any hardware, the node controller would log various errors. First failure data capture components are responsible for transferring this data to the system-controller. Hardware data information collection component executes on the system controller. The hardware data information collection component collects information about existing hardware on the node. This component is also responsible for configuring hardware on the node. The basic software verification component is a software component that verifies that the firmware on the node controllers is useable by the system controller. Those skilled in the art will recognize that the services offered by the failure data capture components, hardware data information collection components, and basic software verification components may vary depending upon specific implementation. However, exemplary embodiments encompass staging the integration of the offered services, whatever the offered may be specifically, incrementally.

The third stage is the basic software services verified phase. Once the basic software of the remote entity has been verified, an event called the basic software verification completed event is published to the distributed network. The event tells the components in the distributed network that the verified software and failover services of the remote entity are now available to any component in the distributed network. If a node controller has failover service enabled then that node controller is capable of becoming the primary node controller in that node in case of a failure of the other node controller. Basic software services means that the node-controller is running sufficient firmware so that various software modules on a system controller can start using the node controller to access hardware in the node.

The fourth stage is the basic hardware services verified phase. Once the basic hardware services of the remote entity have been verified, an event called the basic hardware verification completed event is published to the distributed network. The event tells the components in the distributed network that the basic hardware verification components are now available to any component in the distributed network. The basic hardware verification component is the software component that verifies that the basic hardware of the node is functioning correctly. Basic hardware components are those components that need to be functioning correctly before a system controller can use the full hardware function. Verifying basic hardware services means that both node-controllers view the same amount of hardware in the node that they are plugged into. Due to hardware errors, one node controller may see less hardware than the other node controller may. In such cases, the node controller that sees less hardware would fail the basic hardware verification services.

The fifth stage is the extended hardware services verified phase. In this stage, hardware beyond the remote the unit, that the remote unit is connected to, referred to as extended hardware, is verified. Once the extended hardware services have been verified, an event called the extended hardware verification completed event is published to the distributed network. The event tells the components in the distributed network that the verified extended hardware components are now available to any component in the distributed network.

Optionally, a sixth stage of integration may also be performed. In the sixth stage, the extended software services that are available on the extended hardware are verified. Once the extended software services have been verified, an event called the full integration of disturbed entity event is published to the distributed network. The event tells the components in the distributed network that all services offered by the remote entity, the node, are now available to any component in the distributed network.

If the optional sixth stage is not used, then the event called the full integration of disturbed entity event is published in the fifth stage, once the extended hardware is verified, instead of the extended hardware verification completed event.

Figure 5:
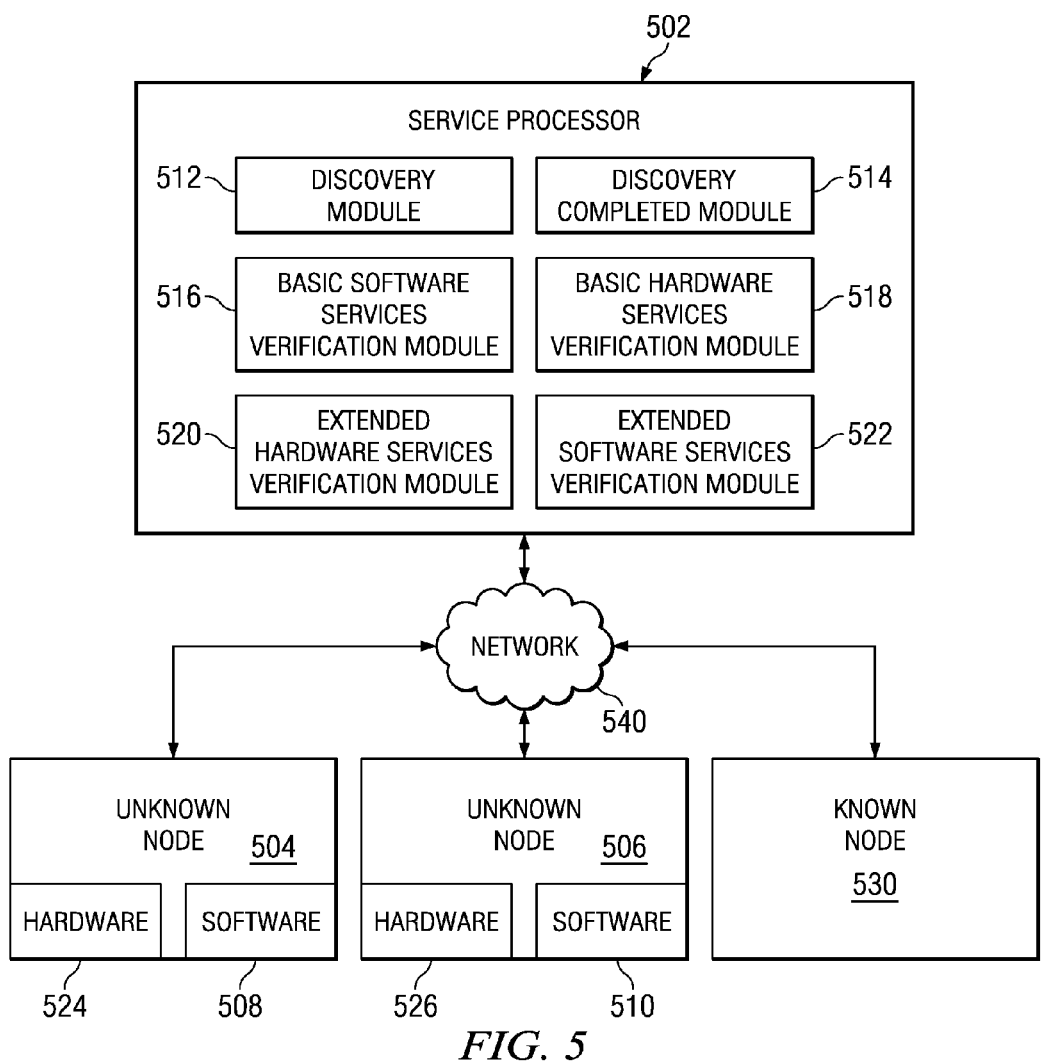
FIG. 5 is a block diagram of a system for the staged integration of a remote data processing system, in accordance with an exemplary embodiment.

FIG. 5 is a block diagram of a system for the staged integration of a remote data processing system, in accordance with an exemplary embodiment. System 500 comprises network 540, which connects service processor 502, unknown nodes 504 and 506, and known node 530. In other illustrative embodiments, system 500 may comprise more or less then one known node, two unknown nodes, and one service processor. Network 540, which may be implemented as network 102 in FIG. 1, is the medium used to provide communications links between various devices and computers connected together within system 500. Service processor 502 is a data processing system, which may be implemented as data processing system 200 of FIG. 2. Unknown nodes 504 and 506 and known node 530 are nodes, which may be implemented as node 402 in FIG. 4. Furthermore, unknown nodes 504 and 506 and known node 530 may be implemented as single nodes in separate data processing systems, as a set of nodes in a single data processing system, or any combination thereof.

Service processor 502 comprises software modules discovery module 512, discovery completion module 514, basic software services verification module 516, basic hardware component verification module 518, extended hardware component verification module 520, and extended software services verification module 522. It should be noted that while in the present example, software modules discovery module 512, discovery completion module 514, basic software services verification module 516, basic hardware component verification module 518, extended hardware component verification module 520, and extended software services verification module 522 are depicted as separate modules, various illustrative embodiments contemplate the software module sin various configurations, such as, for example, but not limited to, all the modules being part of the same module or program, or various module being grouped to together, such as, for example, but not limited to, basic hardware component verification module 518 and extended hardware component verification module 520 being combined to form one modules or extended hardware component verification module 520 and extended software services verification module 522 being combined to form one module. Unknown node 504 comprises software 508 and hardware 524. Unknown node 506 comprises software 510 and hardware 526.

Discovery module 512 may be initiated manually by a user or automatically, at predetermined intervals by service processor 502. When discovery module 512 is activated, discovery module 512 detects unknown nodes 506 and 508. Discovery module 512 then publishes an event called a discovery initiated event throughout system 500. This event tells the system that all services of the newly detected node or nodes are blocked except for the discovery services. When discovery completion module 514 is initiated, discovery completion module 514 completes the discovery process on the nodes detected by discovery module 512. Once the discovery process is completed, discovery completion module 514 publishes an event called a discovery completed event throughout system 500. The event tells the system that, at this time, failure data capture components, hardware data information collection components, and basic software verification components of the newly discovered node are available to be used from the newly discovered node.

Basic software services verification module 516 verifies that the basic software services offered by each newly discovered node, such as software 508 and 510, are actually available for use. Once basic software services verification module 516 completes verification, basic software services verification module 516 publishes an event called a basic software verification completed event throughout system 500. The event tells the system that the verified software and failover services of the newly discovered node are now available for use.

Basic hardware services verification module 518 verifies the correct functioning of the hardware on the newly discovered nodes, such as hardware 524 and 526. Once basic hardware services verification module 518 completes verification, basic hardware component verification module 518 publishes an event called a basic hardware verification completed event throughout system 500. The event tells the system that the basic hardware verification components of the newly discovered node are now available for use.

Extended hardware services verification module 520 verifies hardware beyond the basic hardware of the newly discovered node. For example, unknown nodes 504 and 506 may have other hardware connected to them that are not part of hardware 524 or 526 or unknown nodes 504 and 506 may even serve as gateways to other networks. Extended hardware services verification module 520 verifies this "extended" hardware. Once the extended hardware has been verified, extended hardware component verification module 520 publishes an event called the extended hardware verification completed event to system 500. The event tells system 500 that the verified extended hardware components of the newly discovered node are now available for use.

Extended software services verification module 522 verifies software on the verified extended hardware components verified by extended hardware component verification module 520. Once the extended software has been verified, extended software services verification module 522 publishes an event called the full integration of disturbed entity event to system 500. The event tells the system that all services offered by the newly discovered node, the remote distributed entity, are now available for use.

Figure 6A:
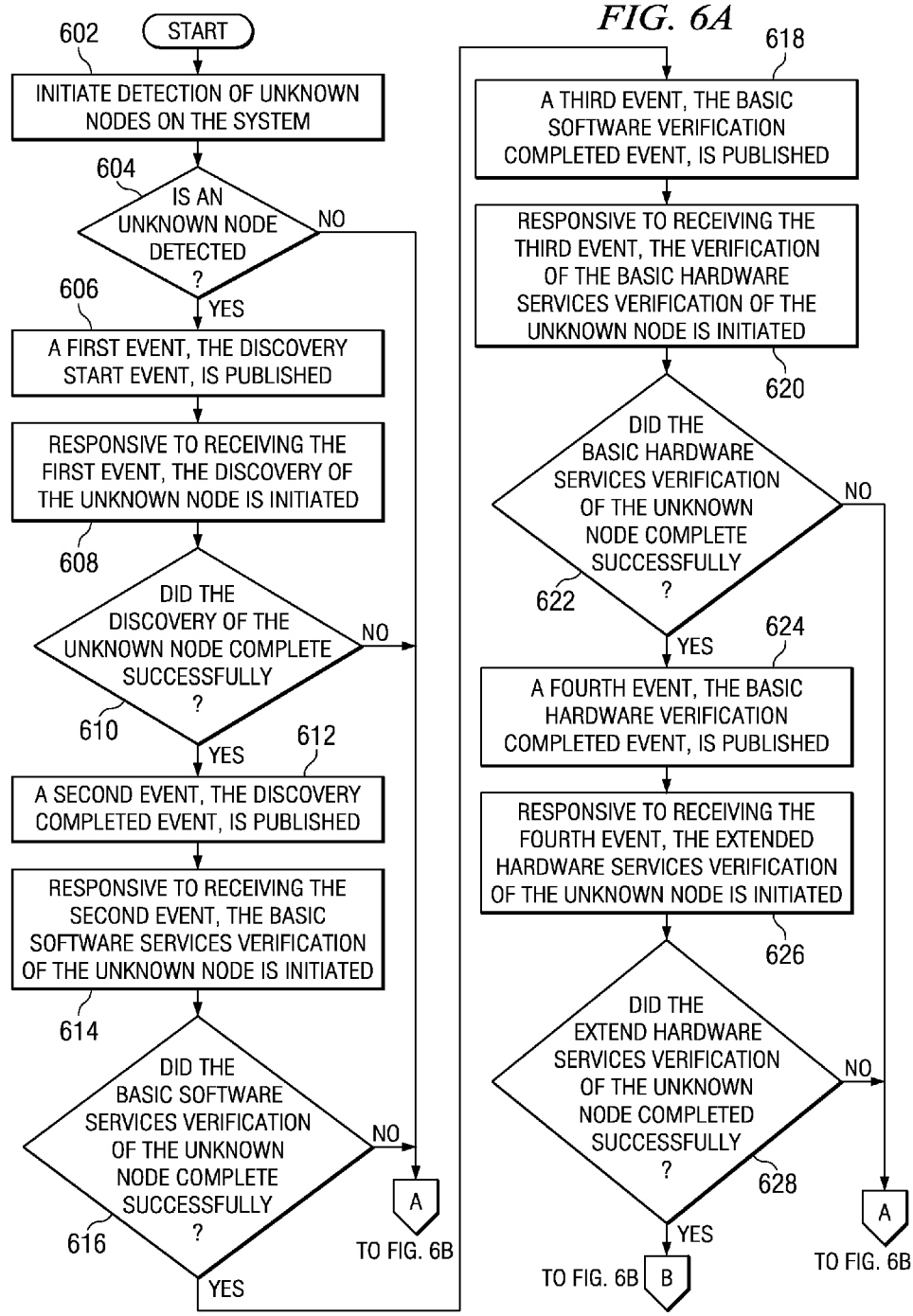
FIGS. 6A and 6B are flowcharts illustrating the operation of a staged integration of a remote entity in accordance with an exemplary embodiment.
Figure 6B:
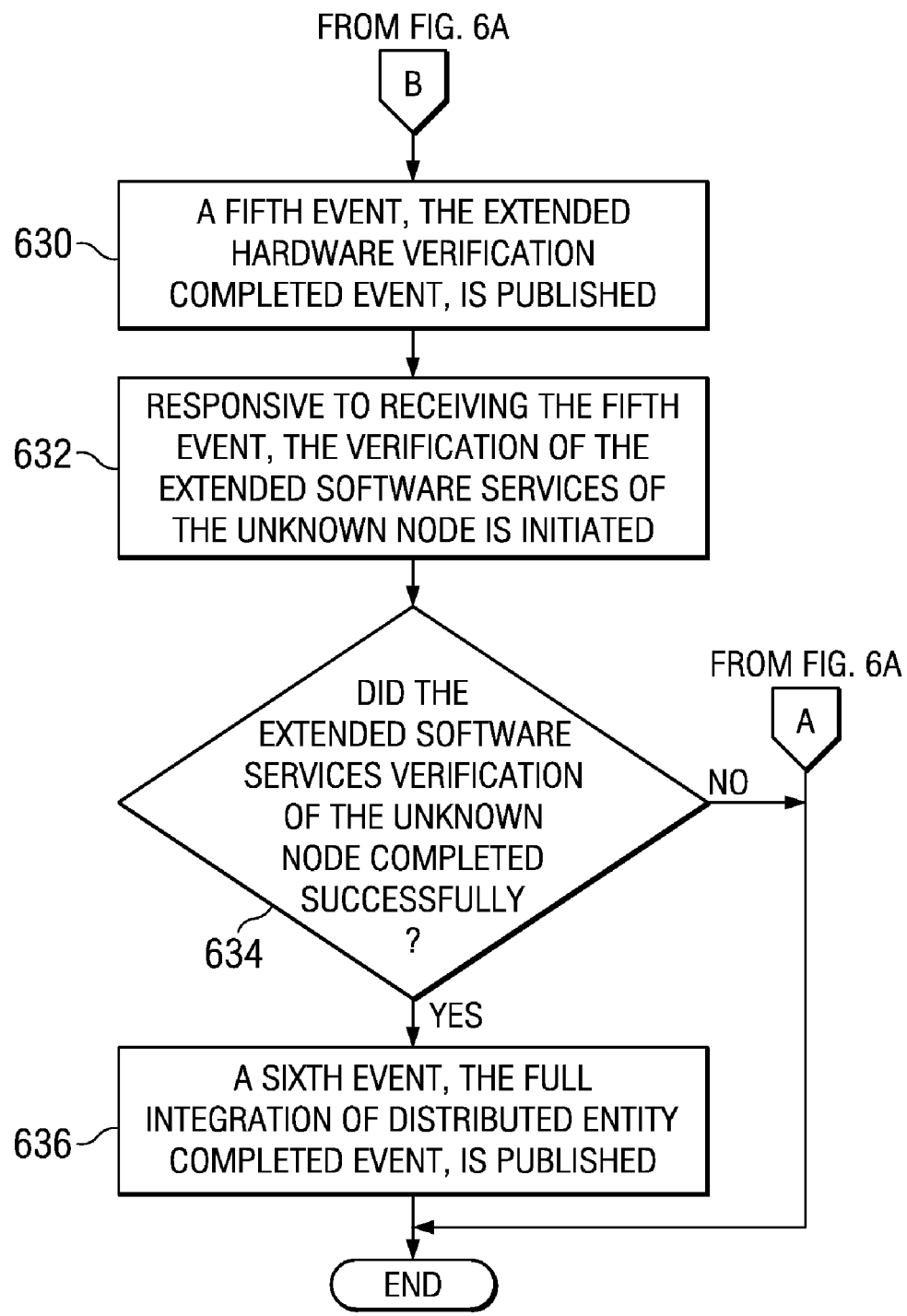

FIGS. 6A and 6B are flowcharts illustrating the operation of a staged integration of a remote entity in accordance with an exemplary embodiment. The operation of FIGS. 6A and 6B may be performed by a service processor, such as service processor 502 in FIG. 5. The operation begins by initiating detection of unknown nodes on the system (step 602). A determination is made as to whether an unknown node is detected (step 604). If an unknown node is not detected (a "no" output to step 604), the operation ends. If an unknown node is detected (a "yes" output to step 604), a first event, the discovery start event, is published (step 606).

Responsive to receiving the first event, the discovery of the unknown node is initiated (step 608). A determination is made as to whether discovery of the unknown node completed successfully (step 610). If the discovery was not completed successfully (a "no" output to step 610), the operation ends. If the discovery was completed successfully (a "yes" output to step 610), a second event, the discovery completed event, is published (step 612).

Responsive to receiving the second event, the verification of basic software services of the unknown node is initiated (step 614). A determination is made as to whether the basic software services verification of the unknown node completed successfully (step 616). If the verification was not completed successfully (a "no" output to step 616), the operation ends. If the verification was completed successfully (a "yes" output to step 616), a third event, the basic software verification completed event, is published (step 618).

Responsive to receiving the third event, the verification of the basic hardware services verification of the unknown node is initiated (step 620). A determination is made as to whether the basic hardware services verification of the unknown node completed successfully (step 622). If the verification was not completed successfully (a "no" output to step 622), the operation ends. If the verification was completed successfully (a "yes" output to step 622), a fourth event, the basic hardware verification completed event, is published (step 624).

Responsive to receiving the fourth event, the verification of the extended hardware services of the unknown node is initiated (step 626). A determination is made as to whether the extend hardware services verification of the unknown node completed successfully (step 628). If the verification was not completed successfully (a "no" output to step 628), the operation ends. If the verification was completed successfully (a "yes" output to step 628), a fifth event, the extended hardware verification completed event, is published (step 630).

Responsive to receiving the fifth event, the verification of the extended software services of the unknown node is initiated (step 632). A determination is made as to whether the extended software services verification of the unknown node completed successfully (step 634). If the verification was not completed successfully (a "no" output to step 634), the operation ends. If the verification was completed successfully (a "yes" output to step 634), a sixth event, the full integration of distributed entity completed event, is published (step 636) and the operation ends.

Steps 632-636 are optional steps. Alternate exemplary embodiments contemplate the operation ending at step 630, in which case, the fifth event would change from "the extended hardware verification completed event" to "the full integration of distributed entity completed event."

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for a staged integration of a remote entity and the simultaneous of services, the computer-implemented method comprising:

responsive to detecting an unknown node, publishing a first event;

responsive to receiving the first published event, initiating discovery of the unknown node;

responsive to successfully completing the discovery of the unknown node, publishing a second event;

responsive to receiving the second event, initiating verification of basic software services offered by the unknown node;

responsive to successfully completing the verification of basic software services offered by the unknown node, publishing a third event;

responsive to receiving the third published event, initiating verification of basic hardware services offered by the unknown node;

responsive to successfully completing the verification of basic hardware services offered by the unknown node, publishing a fourth event;

responsive to receiving the fourth published event; initiating verification of extended hardware services offered by the unknown node; and responsive to successfully completing the verification of extended hardware services offered by the unknown node, publishing a fifth event.

2. The computer-implemented method of claim 1, further comprising:

responsive to receiving the fifth published event, initiating verification of extended software services offered by the unknown node; and responsive to successfully completing the verification of extended software services offered by the unknown node, publishing a sixth event.

3. The computer-implemented method of claim 2, wherein the first event tells components within the distributed network that all services of the unknown node are blocked except for discovery services;

wherein the second event tells the components within the distributed network that failure data capture components, hardware data information collection components, and basic software verification components of the unknown node are available to any component in the distributed network;

wherein the third event tells the components within the distributed network that the verified software and failover services of the unknown node are available to any component in the distributed network;

wherein the fourth event tells the components within the distributed network that the basic hardware verification components of the unknown node are available to any component in the distributed network;

wherein the fifth event tells the components within the distributed network that the verified extended hardware components of the unknown node are available to any component in the distributed network; and wherein the sixth event tells components within the distributed network that all services offered by the unknown node are available to any component in the distributed network.

4. The computer-implemented method of claim 1, wherein the first event tells components within the distributed network that all services of the unknown node are blocked except for discovery services;

wherein the second event tells the components within the distributed network that failure data capture components, hardware data information collection components, and basic software verification components of the unknown node are available to any component in the distributed network;

wherein the third event tells the components within the distributed network that the verified software and failover services of the unknown node are available to any component in the distributed network;

wherein the fourth event tells the components within the distributed network that the basic hardware verification components of the unknown node are available to any component in the distributed network; and wherein the fifth event tells components within a distributed network that all services offered by the unknown node are available to any component in the distributed network.

5. The computer-implemented method of claim 4, wherein the failure data capture components are responsible for transferring error information logged on node controllers of the unknown node to a system controller;

wherein the hardware data information collection component collects information about existing hardware on the unknown node and configures hardware on the unknown node; and wherein the basic software verification component verifies that the firmware on the node controllers is useable by the system controller.

6. The computer-implemented method of claim 4, wherein failover services enable a first node controller to become a primary node controller in the unknown node in case of a failure of a second node controller; and wherein basic software services enable software modules on a system controller to use the second node controller to access hardware in the unknown node.

7. The computer-implemented method of claim 4, wherein the basic hardware verification component is a component that verifies that the basic hardware of the unknown node is functioning correctly; and wherein the basic hardware components are those components that need to be functioning correctly before a system controller can use the full hardware function of the unknown node.

8. A computer program product comprising:
a computer recordable storage device including computer usable program code for a staged integration of a remote entity and the simultaneous of services, said computer program product comprising:
computer usable program code for responsive to detecting an unknown node, publishing a first event;
computer usable program code for responsive to receiving the first published event, initiating discovery of the unknown node;
computer usable program code for responsive to successfully completing the discovery of the unknown node, publishing a second event;
computer usable program code for, responsive to receiving the second event, initiating verification of basic software services offered by the unknown node;
computer usable program code for, responsive to successfully completing the verification of basic software services offered by the unknown node, publishing a third event;
computer usable program code for, responsive to receiving the third published event;
initiating verification of basic hardware services offered by the unknown node;
computer usable program code for, responsive to successfully completing the verification of basic hardware services offered by the unknown node, publishing a fourth event;
computer usable program code for, responsive to receiving the fourth published event, initiating verification of extended hardware services offered by the unknown node; and
computer usable program code for, responsive to successfully completing the verification of extended hardware services offered by the unknown node, publishing a fifth event.

9. The computer program product of claim 8, further comprising:
computer usable program code for, responsive to receiving the fifth published event, initiating verification of extended software services offered by the unknown node; and
computer usable program code for, responsive to successfully completing the verification of extended software services offered by the unknown node, publishing a sixth event.

10. The computer program product of claim 9, wherein the first event tells components within the distributed network that all services of the unknown node are blocked except for discovery services;
wherein the second event tells the components within the distributed network that failure data capture components, hardware data information collection components, and basic software verification components of the unknown node are available to any component in the distributed network;
wherein the third event tells the components within the distributed network that the verified software and failover services of the unknown node are available to any component in the distributed network;
wherein the fourth event tells the components within the distributed network that the basic hardware verification components of the unknown node are available to any component in the distributed network;
wherein the fifth event tells the components within the distributed network that the verified extended hardware components of the unknown node are available to any component in the distributed network; and
wherein the sixth event tells components within the distributed network that all services offered by the unknown node are available to any component in the distributed network.

11. The computer program product of claim 8, wherein the first event tells components within the distributed network that all services of the unknown node are blocked except for discovery services;
wherein the second event tells the components within the distributed network that failure data capture components, hardware data information collection components, and basic software verification components of the unknown node are available to any component in the distributed network;
wherein the third event tells the components within the distributed network that the verified software and failover services of the unknown node are available to any component in the distributed network;
wherein the fourth event tells the components within the distributed network that the basic hardware verification components of the unknown node are available to any component in the distributed network; and
wherein the fifth event tells components within a distributed network that all services offered by the unknown node are available to any component in the distributed network.

12. The computer program product of claim 11, wherein the failure data capture components are responsible for transferring error information logged on node controllers of the unknown node to a system controller;
wherein the hardware data information collection component collects information about existing hardware on the unknown node and configures hardware on the unknown node; and
wherein the basic software verification component verifies that the firmware on the node controllers is useable by the system controller.

13. The computer program product of claim 11, wherein failover services enable a first node controller to become a primary node controller in the unknown node in case of a failure of a second node controller; and
wherein basic software services enable software modules on a system controller to use the second node controller to access hardware in the unknown node.

14. The computer program product of claim 11, wherein the basic hardware verification component is a component that verifies that the basic hardware of the unknown node is functioning correctly; and
wherein the basic hardware components are those components that need to be functioning correctly before a system controller can use the full hardware function of the unknown node.

15. A data processing system for a staged integration of a remote entity and the simultaneous of services, the data processing system comprising:
a bus;
a communications unit connected to the bus;
a storage device connected to the bus, wherein the storage device includes computer usable program code; and
a processor unit connected to the bus, wherein the processor unit executes the computer usable program code to, responsive to detecting an unknown node, publish a first event; responsive to receiving the first published event, initiate discovery of the unknown node; responsive to successfully completing the discovery of the unknown node, publish a second event; responsive to receiving the second event, initiate verification of basic software services offered by the unknown node; responsive to successfully completing the verification of basic software services offered by the unknown node, publish a third event; responsive to receiving the third published event; initiate verification of basic hardware services offered by the unknown node; responsive to successfully completing the verification of basic hardware services offered by the unknown node, publish a fourth event; responsive to receiving the fourth published event, initiate verification of extended hardware services offered by the unknown node; and, responsive to successfully completing the verification of extended hardware services offered by the unknown node, publish a fifth event.

16. The data processing system of claim 15, wherein the processor further executes the computer usable program code to, responsive to receiving the fifth published event, initiate verification of extended software services offered by the unknown node; and, responsive to successfully completing the verification of extended software services offered by the unknown node, publish a sixth event.

17. The data processing system of claim 16, wherein the first event tells components within the distributed network that all services of the unknown node are blocked except for discovery services;
   wherein the second event tells the components within the distributed network that failure data capture components, hardware data information collection components, and basic software verification components of the unknown node are available to any component in the distributed network;
   wherein the third event tells the components within the distributed network that the verified software and failover services of the unknown node are available to any component in the distributed network;
   wherein the fourth event tells the components within the distributed network that the basic hardware verification components of the unknown node are available to any component in the distributed network;
   wherein the fifth event tells the components within the distributed network that the verified extended hardware components of the unknown node are available to any component in the distributed network; and
   wherein the sixth event tells components within the distributed network that all services offered by the unknown node are available to any component in the distributed network.

18. The data processing system of claim 15, wherein the first event tells components within the distributed network that all services of the unknown node are blocked except for discovery services;
   wherein the second event tells the components within the distributed network that failure data capture components, hardware data information collection components, and basic software verification components of the unknown node are available to any component in the distributed network;
   wherein the third event tells the components within the distributed network that the verified software and failover services of the unknown node are available to any component in the distributed network;
   wherein the fourth event tells the components within the distributed network that the basic hardware verification components of the unknown node are available to any component in the distributed network; and
   wherein the fifth event tells components within a distributed network that all services offered by the unknown node are available to any component in the distributed network.

19. The data processing system of claim 18, wherein the failure data capture components are responsible for transferring error information logged on node controllers of the unknown node to a system controller;
   wherein the hardware data information collection component collects information about existing hardware on the unknown node and configures hardware on the unknown node; and
   wherein the basic software verification component verifies that the firmware on the node controllers is useable by the system controller.

20. The data processing system of claim 18, wherein failover services enable a first node controller to become a primary node controller in the unknown node in case of a failure of a second node controller; and
   wherein basic software services enable software modules on a system controller to use the second node controller to access hardware in the unknown node.

* * * * *